United States Patent [19]

Roman

[11] Patent Number: 5,638,422
[45] Date of Patent: Jun. 10, 1997

[54] DISTRIBUTED ANTENNA PERSONAL COMMUNICATION NETWORKS SYSTEM

[75] Inventor: Geoffrey S. Roman, Doylestown, Pa.

[73] Assignee: General Instrument Corp., Hatboro, Pa.

[21] Appl. No.: 821,508

[22] Filed: Jan. 15, 1992

[51] Int. Cl.[6] .................. H04M 11/00; H04H 1/00; H04H 1/02; H04N 7/14
[52] U.S. Cl. .................. 379/58; 455/5.1; 455/6.3; 348/14
[58] Field of Search .................. 358/85, 86; 379/58, 379/59; 455/5.1, 6.1, 6.2, 6.3, 33.1; 348/6, 8, 12, 13, 14; 378/375

[56] References Cited

U.S. PATENT DOCUMENTS

| | | | |
|---|---|---|---|
| 4,352,200 | 9/1982 | Oxman | 455/6 |
| 4,901,367 | 2/1990 | Nicholson | 455/6.2 |
| 4,916,460 | 4/1990 | Powell | 343/853 |
| 4,972,505 | 11/1990 | Isberg | 455/3 |
| 4,982,440 | 1/1991 | Dufresne et al. | 358/86 |
| 5,008,934 | 4/1991 | Endoh | 358/86 |
| 5,027,400 | 6/1991 | Baji et al. | 358/86 |
| 5,027,426 | 6/1991 | Chiocca, Jr. | 358/85 |
| 5,032,820 | 7/1991 | Tanikawa | 358/85 |
| 5,046,093 | 9/1991 | Wachob | 358/86 |
| 5,063,587 | 11/1991 | Semasa et al. | 358/85 |
| 5,133,081 | 7/1992 | Mayo | 455/3.1 |
| 5,153,763 | 10/1992 | Pidgeon | 358/86 |
| 5,181,107 | 1/1993 | Rhoades | 358/86 |
| 5,212,830 | 5/1993 | Miller | 379/59 |
| 5,233,643 | 8/1993 | Naeini et al. | 379/59 |
| 5,266,944 | 11/1993 | Carroll et al. | 375/38 X |
| 5,303,287 | 4/1994 | Laborde | 375/59 |
| 5,381,459 | 1/1995 | Lappington | 379/56 |
| 5,421,030 | 5/1995 | Baran | 348/12 |

OTHER PUBLICATIONS

Invention Disclosure Docket D/615 "Phasecom Cable Phone System" Confidential Material Not Open to Public, to be Opened Only by Examiner or Other Authorized Patent and Trademark Employee.

Bochinghan et al. (Cordless PDX Telephone System on 800 MHZ Based on the DECT Technology) Jan. 1991, entire document.

IEEE, Beasley, "The advantage of Using Casle TV Distribution Plant for Linner PCN microcello", 1992.

IEEE, Hardant, "Intersection of Cordless telephay with Catv Distribution", 1992.

*Primary Examiner*—Curtis Kuntz
*Assistant Examiner*—Paul Loomis

[57] ABSTRACT

A distributed antenna PCN system provides for telephone service on a CATV network. The PCN antenna signal from one PCN node is transported to more than one remotely located antenna nodes via the cable. Thus, rather than having a PCN cell shape equal to the radiation pattern of one antenna node, a distributed antenna system creates a cell shape having a distributed pattern, equal to the sum of the radiation patterns of the individual antenna nodes. A single PCN cell is then not necessarily a contiguous area but may include a number of geographically separated areas so that subscriber locations which are not physically adjacent may be included in the same cell. Therefore, the CATV operator may offer universal service to all subscribers in the CATV system using a first PCN node and add subscribers to the first PCN node as needed, regardless of subscriber location.

2 Claims, 3 Drawing Sheets

(PRIOR ART)

DISTRIBUTED ANTENNA PERSONAL COMMUNICATION NETWORKS SYSTEM

FIELD OF THE INVENTION

The present invention relates to the field of wireless telephone systems, such as personal communication networks (PCN).

BACKGROUND OF THE INVENTION

Personal communication networks are wireless telephone systems in which a geographic area is divided into cells. Near the center of each cell is a radio antenna node coupled to a PCN node. Subscribers within range of the antenna are provided with wireless telephone service.

The PCN node contains a portion of the network intelligence, such as incoming call establishment, signal routing, and frequency assignment. Each cell is geographically defined by the shape of the radiation pattern from the cell antenna. The cells may or may not be contiguous. In some systems, known as full cellular systems, the cell coverage is continuous within a given service area, and the system permits originating or receiving calls by any subscriber within any cell, and also allows movement from cell to cell while a call is in progress. Cellular systems provide all the features of a wired telephone system, with the additional advantage of full mobility. System features, such as cell to cell mobility, require considerable complexity in each node and in the network control. For example, channel frequencies are used in more than one cell at the same time to provide adequate channel capacity. However, to avoid adjacent cell interference, the same channel frequencies are not reused in adjacent cells. If the caller leaves the cell, channel frequencies must be dynamically reassigned.

Simpler PCN systems, on the other hand, provide less than all the features of a full cellular system. For example, in some PCN system arrangements, a call can be received in any cell; however, if the subscriber leaves the cell, the call connection is lost. Still simpler PCN systems may assign a subscriber to receive or make calls from a single home cell (residential service), or permit outgoing calls only (pay phone service), or have some other mix of features and capabilities. Although PCN networks are often defined as wireless telephone networks with less than all the features of a full cellular network, the term PCN as used herein, includes all wireless telephone networks. In any event, network intelligence resides in the individual PCN nodes, and a typical PCN network might be described as a distributed intelligence network.

Numerous systems have been proposed for providing telephone service via cable television (CATV) systems, both regular (wired instrument) telephone service, and PCN. The PCN nodes are geographically distributed as before, and the CATV system provides the connection between the nodes. Communication between PCN nodes, which might have been carried by dedicated wire or otherwise, is modulated onto the cable spectrum and received point to point between PCN nodes. In this manner, the cable system acts as a preexisting wired network so that distributed intelligence PCN nodes can be deployed without adding new wiring or using dedicated telephone lines.

SUMMARY OF THE INVENTION

One of the difficulties of the prior art approach is that each PCN cell requires a PCN node. The PCN node tends to be an expensive component which is shared among a number of subscribers. The cable operator desires to offer telephone service universally to all subscribers in the cable service area. To offer universal service would require initial installation of all PCN nodes, or the installation of additional PCN nodes as new service requests are received. A PCN node installed to provide a single subscriber with telephone service would likely be cost prohibitive. Similarly, a PCN node installed at a remote location may never include enough subscribers to justify the cost of installing and maintaining the PCN node. It would be desirable to be able to install a first PCN node which would serve the entire cable service area, and add subscribers to the first PCN node as needed, regardless of subscriber location.

The present invention is embodied in a system for providing PCN service on a CATV network. Instead of using the cable to connect only PCN intelligence nodes, thereby creating a distributed intelligence network, the present system uses the cable system to create a distributed antenna network. The PCN antenna signal from one PCN node is transported to more than one distant antenna node via the cable. Thus, rather than having a PCN cell shape equal to the radiation pattern of one antenna node, a distributed antenna system creates a cell shape having a distributed pattern, equal to the sum of the radiation patterns of the individual antenna nodes. A single PCN cell is then not necessarily a contiguous area but may include a number of geographically separated areas.

The implications are significant. First, individual antenna nodes may provide low power and have limited range. That is, since the cell is distributed (because the antenna nodes are distributed), each antenna node may cover a smaller area than the whole PCN cell. Second, by transporting the PCN antenna signal to different antenna nodes on the CATV system, subscriber locations which are not physically adjacent may be included in the same cell. Third, antenna nodes tend to be simple and inexpensive compared to PCN nodes. PCN nodes provide system intelligence. The PCN antenna signal is the product of the PCN node intelligence. Transporting the PCN antenna signal between the PCN node and the subscriber telephone instrument (the wireless link) is essentially a passive transport. In the present invention, distributed antenna nodes extend the reach of the PCN antenna signal to distant points. Therefore, the CATV operator may offer universal service to all subscribers in the CATV system using a first PCN node and add subscribers to the first PCN node by adding antenna nodes as needed, regardless of subscriber location.

DETAILED DESCRIPTION

Figure 4:
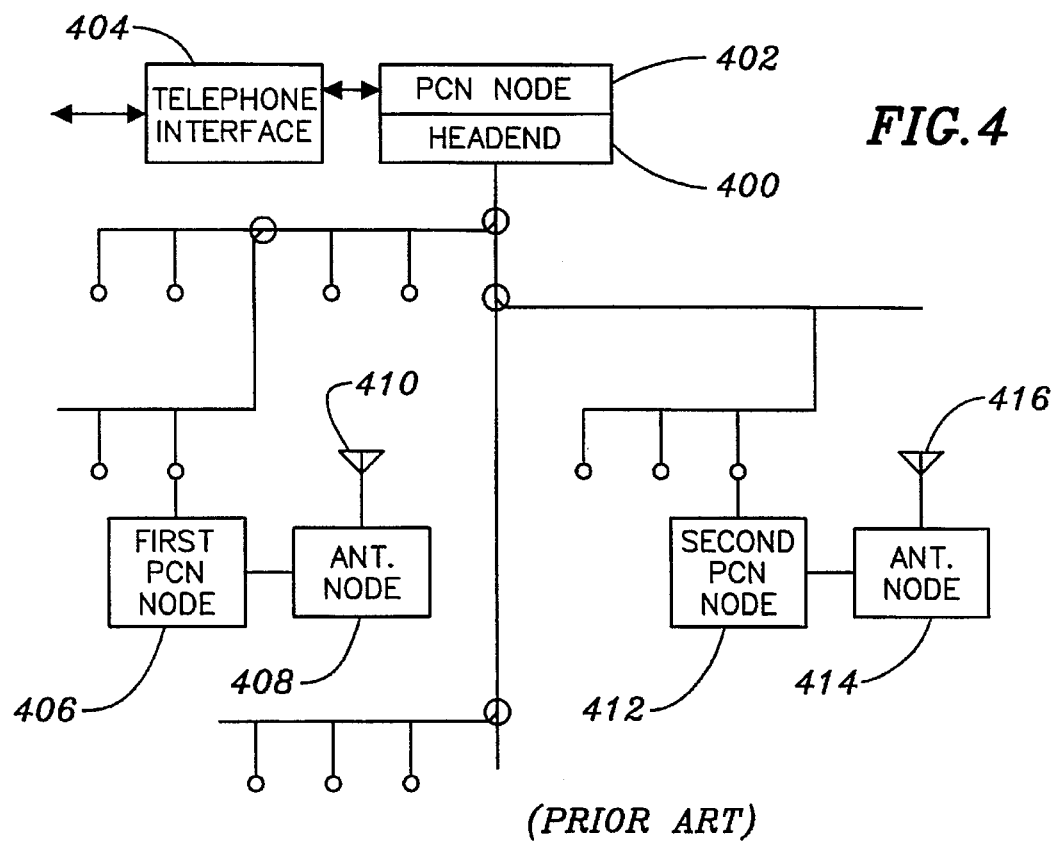
FIG. 4 is a block diagram of a CATV system deploying a PCN network as known in the prior art.

As a comparison between the prior art and the present invention, consider a prior art distributed intelligence system architecture for deploying a PCN system over a CATV network as shown in FIG. 4. A PCN node 402 is typically located at the headend 400 and connects to the telephone switching network via a telephone interface 404. PCN node 402 may alternatively be located elsewhere on the CATV network. The CATV system provides connectivity from PCN node 402 to a first PCN node 406, its associated antenna node 408 and antenna 410. The CATV system also provides connectivity to a second PCN node 412, its associated antenna node 414 and antenna 416. The prior art system has the following disadvantages. First, to provide incremental PCN service throughout the CATV system additional PCN nodes have to be established as necessary in order to insure coverage. Each antenna, such as antenna 410 at antenna node 408, provides service in a single cell associated with PCN node 406. Therefore, in order to deploy PCN service throughout the system additional PCN nodes and associated antenna nodes have to be provided everywhere. Providing service throughout the entire system requires the establishment of PCN nodes everywhere. Since PCN nodes contain substantial amounts of network intelligence, the distributed intelligence approach is expensive.

Figure 5:
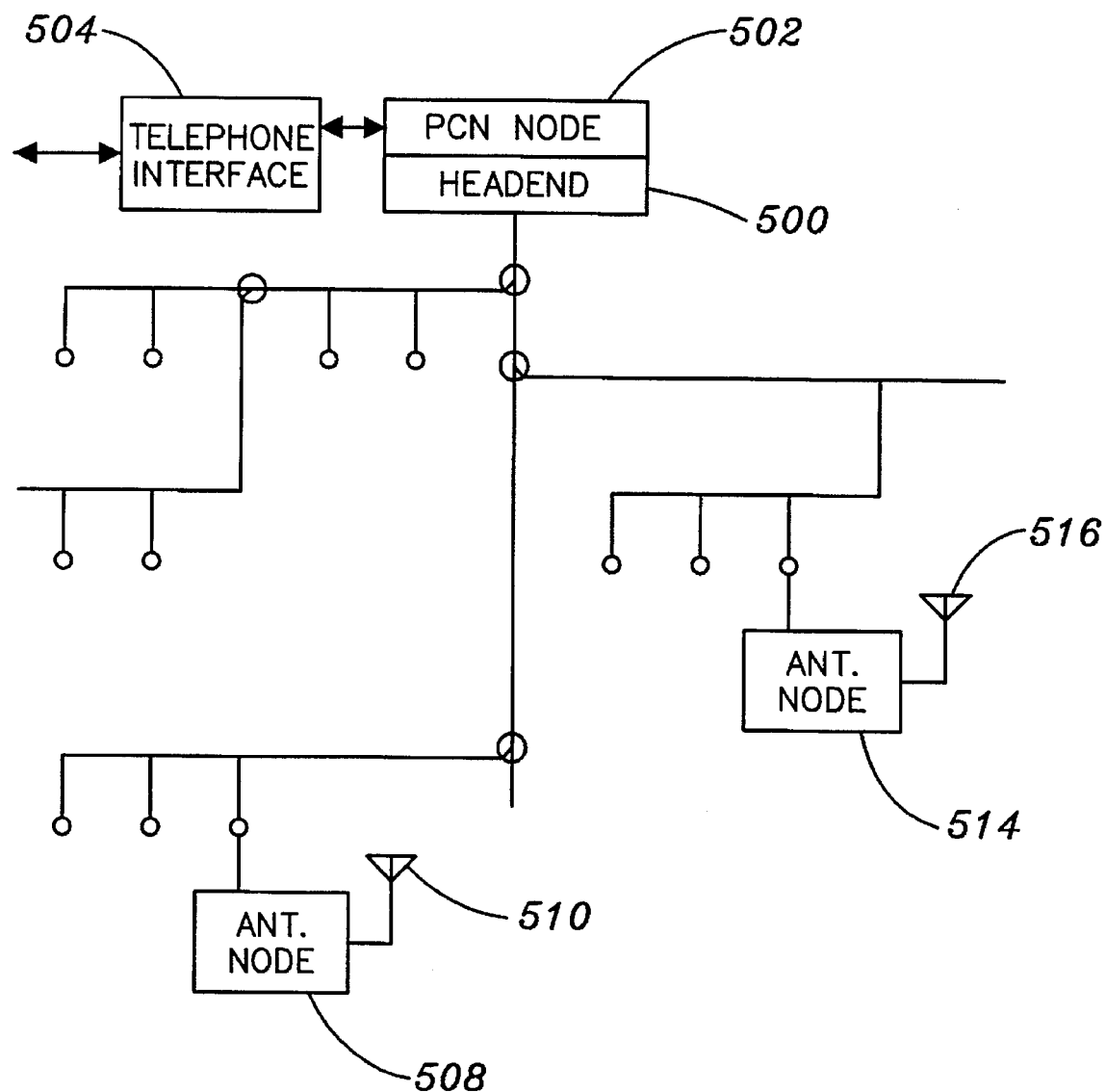
FIG. 5 is a block diagram of a distributed antenna PCN system in accordance with the present invention deployed in a CATV system.

Contrast the distributed antenna PCN system shown in FIG. 5. A PCN node 502 may be located at headend 500 or elsewhere on the CATV system, and connected to the public telephone network through a telephone interface 504. A first antenna node 508 and its associated antenna 510 is placed anywhere on the CATV system. Thus, PCN service is provided within the radiation pattern of antenna 510. A second antenna node 514 and its associated antenna 516 may be placed anywhere within the CATV system, even though distant from antenna node 508. Thus, PCN service is provided within the radiation pattern of antenna 516. Only one PCN cell has been established. However, the PCN cell that has been established is not contiguous. It is partially centered around antenna 510 and partially centered around antenna 516. Additional subscribers may be added to the cable system without adding additional PCN nodes. Instead, additional antenna nodes are added throughout the CATV system extending the effective area covered by PCN node 502 to additional subscribers until such time as the capacity of the PCN node 502 is reached. At that point, it would be necessary to add an additional PCN node elsewhere in the CATV system by dividing the CATV system into at least two areas.

Figure 1:
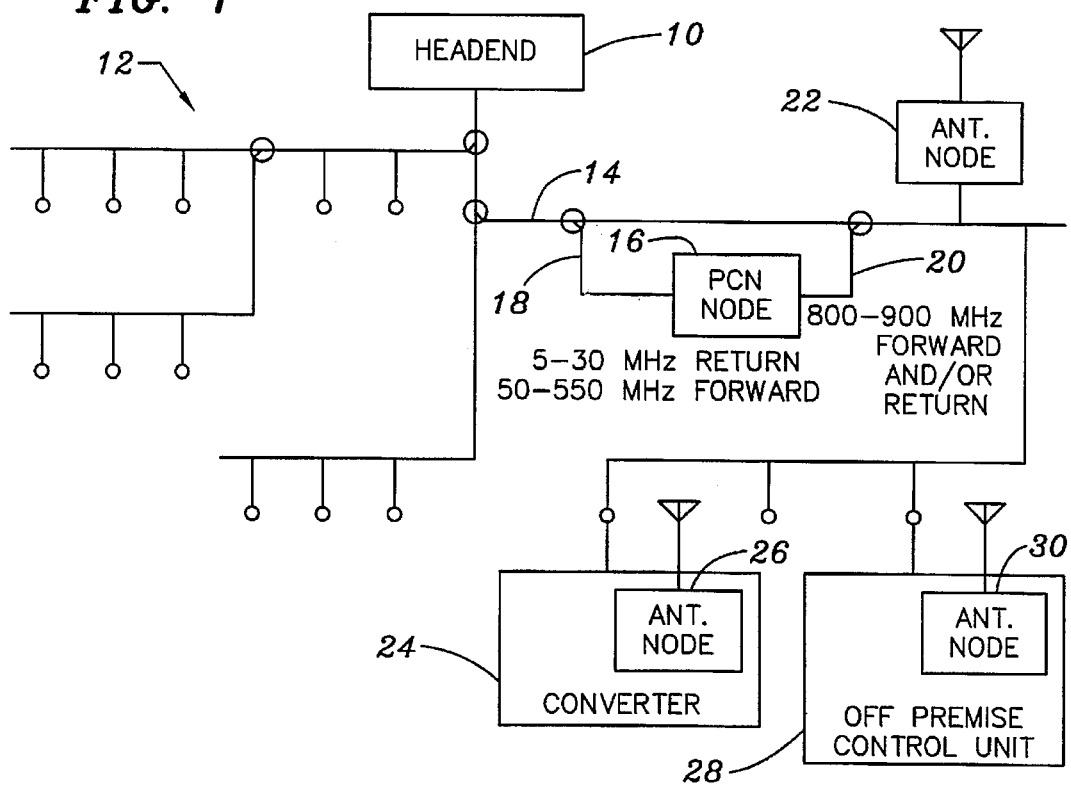
FIG. 1 is a block diagram of a CATV system embodying a distributed antenna PCN system in accordance with the present invention.

An arrangement by which a portion of the CATV system is served by a distributed antenna PCN system in accordance with the present invention is shown in FIG. 1. A headend 10 serves a CATV network 12. It is desired to provide PCN service to subscribers on feeder cable 14. PCN node 16 utilizing transmit and receive frequencies in the 800 to 900 MHz range is coupled by conductor 20 to the feeder cable via a combiner network. The frequency band 800 to 900 MHz is shown as an example, but any band of frequencies above normal CATV bandpass may be used. PCN node 16 is coupled to the feeder 14 via a conductor 18 in order to use the return path of the CATV system, i.e. 5 to 30 MHz, for telephone traffic in the return direction. PCN node 16 is also coupled to the feeder 14 via conductor 18 in order to use the forward spectrum, i.e. 50 to 550 MHz of the CATV system for telephone traffic in the forward direction. CATV fiber optic plant may serve as the link from the headend 10 to the PCN node 16 as well as provide CATV service trunking to feeder 14.

The PCN antenna signal, as used herein, is a bidirectional signal including voice, control and/or data signals in both directions, i.e. from the PCN node to the telephone instrument, as well as signals from the telephone instrument to the PCN node. Typically, a first frequency is used for communication in one direction and a second non-interfering frequency is used for communication in the other direction. A wide variety of modulation techniques are available. Terms such as coupled to, generating, receiving, or responsive to a PCN signal are to be interpreted to include both directions of bidirectional voice and data transfer. Similarly, as used herein, the radiation pattern of an antenna includes both the area of the transmit radiation pattern, and the coincident area of the receive radiation pattern. It is understood that separate co-located transmit and receive antennas are equivalent to the single bidirectional antenna shown. Also, although the following description is cast in terms of a CATV network, any other wired two way technology may be substituted for the transport between distributed antenna nodes of the present invention. Therefore, CATV is to be deemed equivalent to an optical fiber, or other transport medium for the purpose of describing and claiming the present invention. In addition, telephone service can be analog or digital, and in digital form, telephone service is equivalent to a bidirectional data service.

The distributed antenna PCN system of FIG. 1 provides transport of the PCN antenna signal associated with PCN node 16 to three separate antenna nodes 22, 26, 30. The first of these nodes 22 can be a stand alone unit such as might be installed in a shopping mall. Another antenna node 26 is shown in a CATV converter 24 installed in the subscriber's home. A third antenna node 30 is part of an off-premise control unit 28 outside of another subscriber's home. The antenna nodes 30, 26 and 22 would generally not be contiguous, however, all of the PCN service areas within the range of the three antenna nodes 30, 26 and 22 would be considered a single PCN cell. Other areas of the cable TV system 12, not on feeder 14 could be served by other PCN nodes (not shown).

Figure 2:
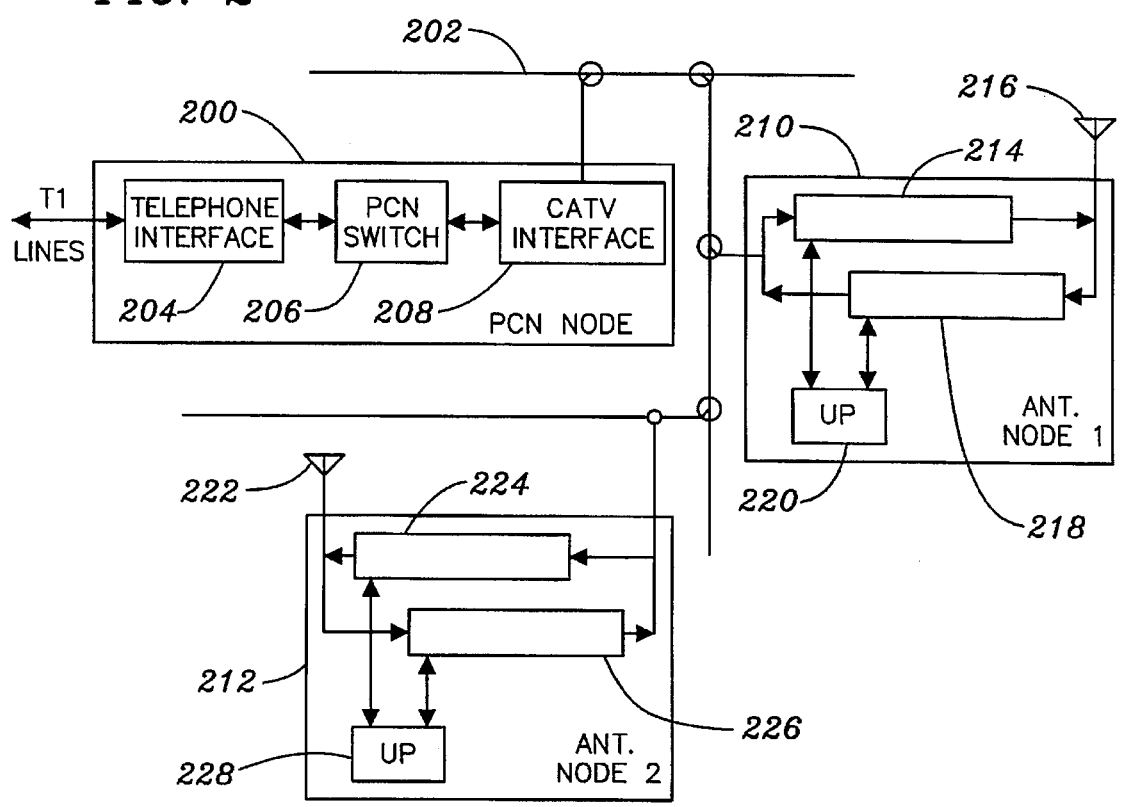
FIG. 2 is a block diagram of a portion of a CATV system including a distributed antenna PCN system embodying the present invention.

A block diagram illustrating further details of a PCN node 200 and two antenna nodes 210, 212 is shown in FIG. 2. Feeder cable 202 is coupled to PCN node 200 which comprises a telephone interface 204, a PCN switch 206 and a CATV interface 208. Each of antenna node 1 and antenna node 2 comprises respective transceivers 218 and 214, transceivers 224 and 226, antennas 216 and 222 respectively, and respective microprocessors 220 and 228. Antenna node 1 and antenna note 2 are similar and therefore the operation of only one will be described. Each node has a transceiver for incoming telephone traffic on one frequency band and a separate transceiver for outgoing telephone traffic on a separate frequency band.

The telephone interface 204 provides connectivity to standard analog or digital lines for telephone traffic. The CATV system may also carry the telephone traffic on the cable to and from the headend on the forward and return spectrum of the CATV system respectively for connection to the telephone switching network at the headend as previously shown in FIG. 1. PCN switch 206 provides some portion of the intelligence for the PCN node to which it relates, such as call routing and the like. PCN switch 206 also provides signals to control a CATV interface 208 which conditions the signals from PCN switch 206 to be transported on the cable 202.

The cable 202 provides transparent transport of the PCN antenna signal to antenna node 1 and antenna node 2. Within antenna node 1, outgoing traffic is sent (transmitted) by transceiver 214 which provides an output to antenna 216. Returning traffic is received on antenna 216 and transceiver 218. Transceiver 218 forwards the returning traffic onto the CATV system for reception for the CATV interface 208. Thereafter, PCN switch 206 and telephone interface 204 provides connectivity for the returning traffic. Antenna node 1 and antenna node 2 may use the same frequency band as the frequency band for the PCN cell antenna radiation pattern as is used in the CATV system for transport to and from the PCN node, i.e., 800–900 MHz, or, by the use of up converters and down converters, the antenna nodes may use another frequency band such as 1.8–2.0 GHz for the PCN antenna radiation pattern.

Antenna node 2 operates in a similar manner. Therefore, a single PCN cell is provided by the radiation patterns of antenna 216 and 222, which antenna radiation patterns need not be contiguous. Additional subscriber areas may be added by adding additional antenna nodes.

Figure 3:
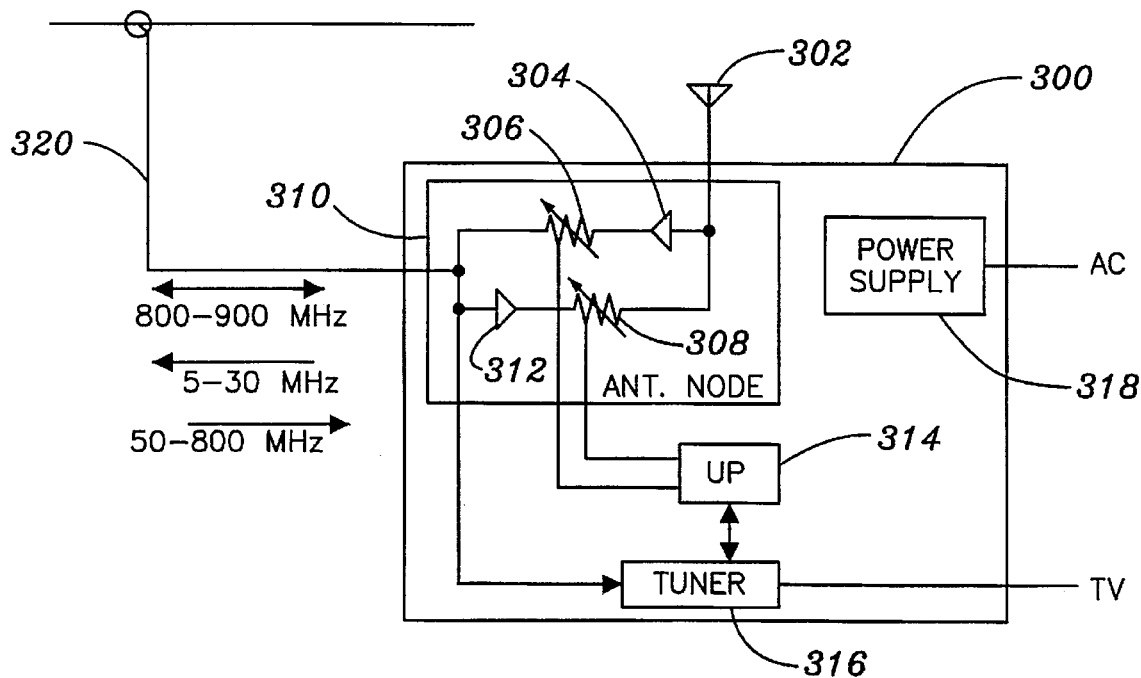
FIG. 3 is a block diagram of an antenna node incorporated in a CATV converter for use in conjunction with the present invention.

FIG. 3 illustrates an antenna node 310 which is part of a CATV converter 300. The converter 300 includes a tuner 316, a microprocessor controller 314 and a common power supply 318. The antenna node 310 comprises a receiver 304, the input of which is coupled to antenna 302, and a transmitter 312 also coupled at the output through a variable attenuator 308 to antenna 302. The output of receiver 304 through variable attenuator 306, and the input of transmitter 312 are coupled to the CATV system via the subscriber drop line 320.

In operation, the antenna node 310 receives transmit and receive frequencies in the 800 to 900 MHz range in this example and provides these transmit and receive frequencies to antenna 302 to create a PCN cell. The converter 300 operates normally on the forward (50 to 800 MHz) and return (5 to 30 MHz) subsplit, or alternatively, midsplit or high split spectrum. Tuner 316 under the control of microprocessor 314 selects the desired signals to be connected to the subscriber's television. The antenna node 310 shares a common power supply 318, microprocessor 314 and the general housing and structural support of the converter 300. The converter 300 would then provide a PCN node for the subscriber's household.

Variable attenuators 306 and 308 within antenna node 310 are set under the control of microprocessor 314. Variable attenuator 308 provides control over the output level that is broadcast to the portable phone instrument, while variable attenuator 306 provides control over the receive level from the telephone instrument that will be returned on the cable return path. Thus, the strength of the signal within the PCN cell in the subscriber's home may be controlled, thereby controlling the range of the PCN cell in the distributed antenna system.

Thus, a CATV operator may offer PCN service without the necessity for distributing PCN nodes throughout the entire service area. Any subscriber on the cable TV system will be able to receive service if desired. As the number of subscribers increases beyond the capacity of one PCN node, additional PCN nodes may be added. Therefore, a single PCN node may be permitted to serve a much larger area than would normally be allowed. Antennas inside the home simplify the problem of RF penetration of the home exterior. Also, a distributed antenna system in accordance with the present invention permits antenna mountings in underground and buried plant applications which would normally be difficult to reach via centrally located outdoor antenna.

What is claimed is:

1. A personal communication network (PCN) system for providing wireless telephone service to a plurality of subscribers comprising a CATV network coupled to a source of TV signals for transmission along a cable of the CATV network, a first PCN node coupled to a source of telephone network signals, said PCN node receiving incoming telephone signals, converting said incoming signals to outgoing antenna signals and transmitting said outgoing antenna signals to said cable for transmission along said cable, a plurality of spaced apart first antenna nodes for parallel receipt of said outgoing antenna signals, each of said antenna nodes receiving the same antenna signals and broadcasting said signals into spaced apart geographic areas serviced by respective ones of said antenna nodes, and each of said antenna nodes receiving return broadcast signals from subscriber units within the area serviced by said each antenna node and directly transferring without alteration said return broadcast signals to said cable for transmission along said cable, said PCN node receiving said return broadcast signals from all of said antenna nodes and converting said return broadcast signals to outgoing telephone signals for transfer to said telephone network.

2. A PCN system in accordance with claim 1 including a group of second PCN nodes coupled to said cable at spaced apart positions along said cable, each of said second PCN nodes being coupled to a respective second antenna node for creating respective PCN second cells each comprising a geographical area enclosing a respective second antenna node, and said spaced apart geographic areas serviced by respective ones of said first antenna nodes being spaced apart by one of said second cells.

\* \* \* \* \*